May 3, 1938.  H. BILLE  2,116,007
APPARATUS FOR THE TREATMENT OF PLASTIC EXPLOSIVES FOR
THE PRODUCTION OF RIBBON OR ROD-SHAPED PIECES
Filed Feb. 26, 1936  2 Sheets-Sheet 2
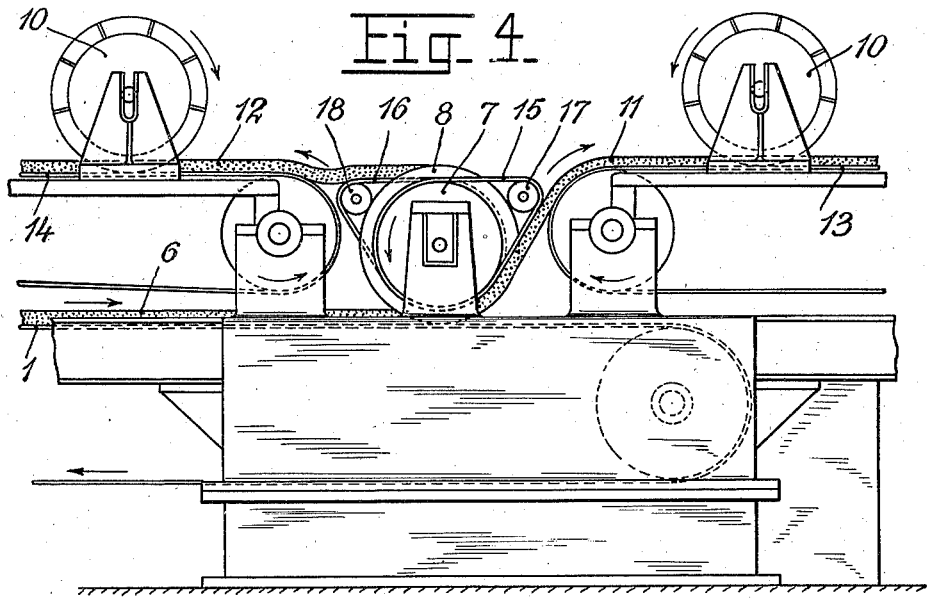
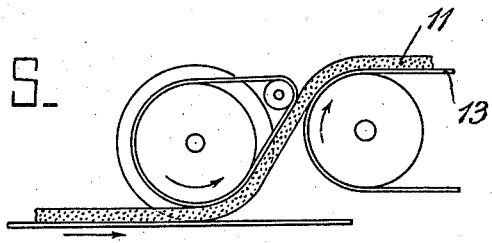
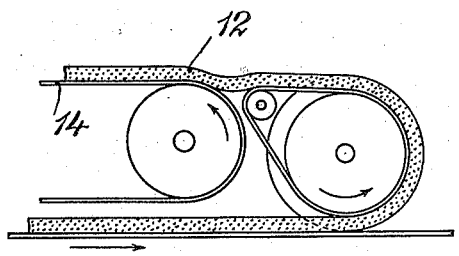
Inventor
Henrich Bille
By E. F. Wenderoth
Atty Patented May 3, 1938

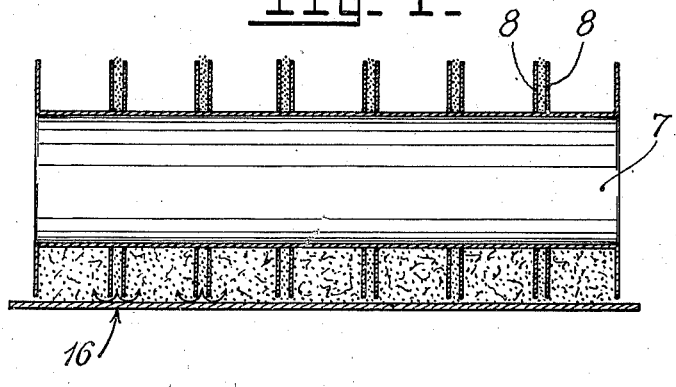
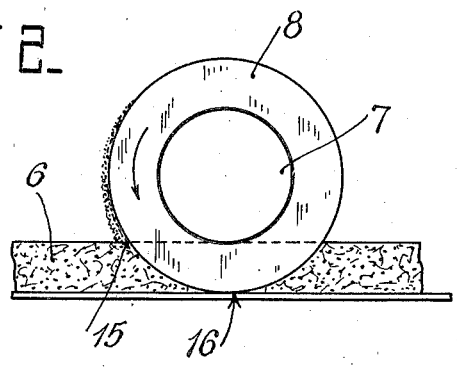
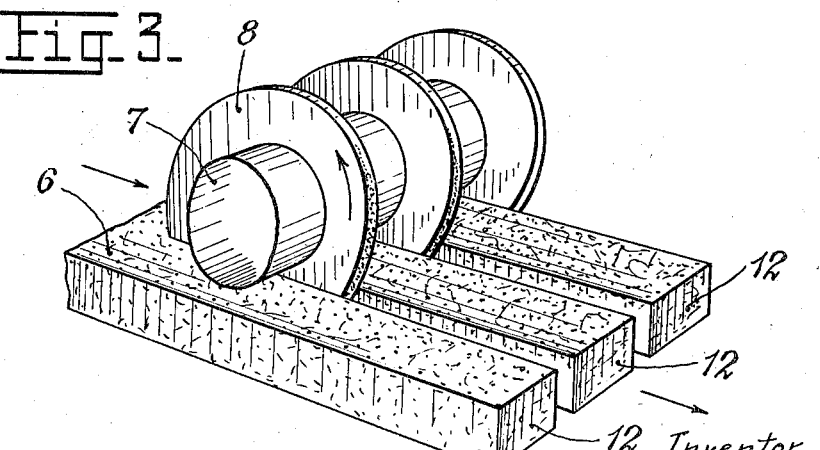

2,116,007

UNITED STATES PATENT OFFICE 2,116,007

APPARATUS FOR THE TREATMENT OF PLASTIC EXPLOSIVES FOR THE PRODUCTION OF RIBBON- OR ROD-SHAPED PIECES

Henrich Bille, Saetre in Royken, Norway, assignor to Norsk Spraengstofindustri A/S, Oslo, Norway Application February 26, 1936, Serial No. 65,914
In Norway March 15, 1935

1 Claim. (Cl. 18—1)

Owing to the drawbacks and dangers connected with the extrusion of plastic explosives through mouth pieces under high pressure, it has been proposed to form masses of this kind into rods or strips by dividing a rolled sheet of the mass into parallel, longitudinal strips.

As masses of this kind are very liable to stick together, and are also liable to stick to the surface on which they are conveyed, the further treatment of the mass strips or rods after the division is accompanied by certain difficulties, which are avoided by means of the method and the arrangements forming the subject matter of the present invention.

In accordance with the present invention the plastic mass is first rolled in a known manner, so as to form a sheet of suitable thickness, and this sheet is then placed on a continuously moving conveyor surface on which it is divided into a suitable number of parallel strips by means of knives arranged at a suitable distance above the conveyor surface. During or immediately after the cutting into strips the strips are spaced apart, so that no contact can take place between two adjacent strips.

This spacing of adjacent strips may be obtained in different ways, for instance by conveying adjacent strips on to different conveying surfaces, which may be on the same or on different levels.

In case rotating, circular knives are used for the dividing operation, the spacing of adjacent strips may also be obtained by mounting the circular knives on a rotating shaft alternately at a distance apart corresponding to the breadth of the strips and a very small distance.

Between the circular knives, which are only a very small distance apart, there will be cut out a very narrow strip, which will remain between the circular knives.

On the point of the circumference at which the knives arrive in contact with the mass sheet on the conveyor, the part of the mass remaining between the two knives which are close together will be somewhat compressed, so that an additional quantity of mass will be taken up between these circular knives, and this surplus of mass will spread out in both directions laterally approximately at the point where the circumference of the circular knives again leaves the conveyor surface.

In this way the thin mass film usually connecting two adjacent strips will be torn at this point, and the mass which is carried round with the knives will at the next turn be added to the normal strips and cut by means of the knives.

With this arrangement the strips leave the cutting knives spaced a distance apart corresponding approximately to the distance between the closely adjacent circular cutting knives, and this distance is sufficient to prevent contact between the plastic strips owing to the unavoidable deformation of cross section taking place after the division.

On the drawings is diagrammatically illustrated some arrangements by means of which the present method may be carried out.

Figures 1 and 2 are a diagrammatical cross section and longitudinal section on a larger scale of a particular form of cutting knives.

Figure 3 is a perspective view of some of the last mentioned cutting knives during operation, Figure 4 is a side view of a form of the cutting and spacing device, and Figures 5 and 6 are diagrammatic sections through two adjacent strips illustrating the manner in which these strips are conducted to different conveyors.

Referring to the drawings, 1 is a continuous conveyor belt the upper part of which moves over a stationary surface and conducts the plastic mass 6 to circular knives 8 mounted in pairs closely together on a roller 7, the said knives being adapted to cut up the sheet-like mass 6 into strips of suitable breadth.

Knife roller 7 and the knives 8 may preferably be manufactured from a material such as synthetic resin, paraffin impregnated fiber mass or the like, to which the plastic mass is not likely to stick.

With particular reference to Figures 4, 5 and 6, the strips 11 and 12 after being cut by means of the knife roller 7, 8 are conducted to different conveyors 13, 14 disposed in the same plane but moving in opposite directions. Every second strip is conducted to one conveyor 13 and the other strips to the other conveyor 14, this being effected by placing on the roller 7 between the circular knives 8 narrow conveying ribbons 15, 16, which run over 17, 18 placed on opposite sides of the roller 8.

The effect of this arrangement as indicated on Figures 5 and 6 is to conduct the strips 11 onto the conveyor 13 and the strips 12 onto the conveyor 14, the cutting of said strips being effected in the usual manner by knife rollers 10. In the space between the knives of each pair, there will remain mass which is somewhat compressed from the point 15 (Fig. 2) at which the knives meet the mass sheet 6 and is forced out laterally towards both sides, as indicated at 16 on Fig. 1 approximately at the point where the circumference of the circular knife is again leaving the conveying surface.

The mass which is conducted in this manner to the regular strips will at the same time tear the thin film, which will otherwise usually remain between the strips.

The effect of this arrangement is best seen on the perspective view Fig. 3, from which it will be noted that the strips 12 will be left a distance apart which is sufficient to prevent contact between the strips owing to deformation.

I claim:

Apparatus for the treatment of plastic explosives for producing strips or the like, comprising a continuously moving conveyor surface, a set of rotating circular cutting knives located above the said conveyor surface, two continuously moving conveyor belts extending in opposite directions from points adjacent the rotating cutting knives and at a level above the first named conveyor surface and auxiliary conveyor belts fitting between the cutting knives and passing alternately over rollers located on opposite sides of said cutting knives for conducting cut strips from said knives on to each of the two conveyor belts located on opposite sides of the cutting knives.

HENRICH BILLE.